United States Patent
Joshi et al.

(10) Patent No.: US 9,542,379 B1
(45) Date of Patent: Jan. 10, 2017

(54) SYNCHRONIZING ELECTRONIC PUBLICATIONS BETWEEN USER DEVICES

(71) Applicant: Amazon Technologies, Inc., Reno, NV (US)

(72) Inventors: Lokesh Joshi, Mercer Island, WA (US); Kathirvel Thannasi, Chennai (IN); Venkata Krishnan Ramamoorthy, Chennai (IN); Ankur Jain, Seattle, WA (US); Palanidaran Chidambaram, Chennai (IN); Walter Manching Tseng, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 389 days.

(21) Appl. No.: 13/623,002

(22) Filed: Sep. 19, 2012

(51) Int. Cl.
| G06F 17/00 | (2006.01) |
| G06F 17/24 | (2006.01) |
| G06F 17/22 | (2006.01) |
| G06F 17/21 | (2006.01) |

(52) U.S. Cl.
CPC ........... *G06F 17/248* (2013.01); *G06F 17/211* (2013.01); *G06F 17/2247* (2013.01)

(58) Field of Classification Search
CPC .. G06F 17/2247; G06F 17/211; G06F 17/227; G06F 17/248; H04L 41/18; H04L 12/1827; H04L 67/02; H04L 5/04
USPC ......... 715/235, 716, 730, 731; 709/205, 218
See application file for complete search history.

(56) References Cited

U.S. PATENT DOCUMENTS

| 5,146,552 | A | 9/1992 | Cassorla et al. |
| 6,260,011 | B1 | 7/2001 | Heckerman et al. |
| 6,295,541 | B1 | 9/2001 | Bodnar et al. |
| 6,933,928 | B1 | 8/2005 | Lilienthal |
| 8,181,106 | B2* | 5/2012 | Andeen ............... G06F 17/2247 715/234 |
| 8,225,191 | B1* | 7/2012 | Kalman ...................... 715/203 |
| 8,425,325 | B2* | 4/2013 | Hope ............................. 463/42 |
| 2002/0054073 | A1 | 5/2002 | Yuen |
| 2003/0101235 | A1* | 5/2003 | Zhang .......................... 709/218 |
| 2003/0101329 | A1 | 5/2003 | Lahti et al. |
| 2003/0120672 | A1* | 6/2003 | Bingham ............. G06F 17/3089 |
| 2003/0131045 | A1 | 7/2003 | McGee et al. |
| 2005/0022113 | A1 | 1/2005 | Hanlon |
| 2005/0027755 | A1 | 2/2005 | Shah et al. |
| 2005/0138551 | A1 | 6/2005 | Elazar et al. |
| 2005/0177617 | A1 | 8/2005 | Banginwar et al. |
| 2005/0228891 | A1 | 10/2005 | Itoh et al. |
| 2006/0002681 | A1 | 1/2006 | Spilo et al. |
| 2006/0085429 | A1 | 4/2006 | Wener et al. |
| 2007/0055926 | A1 | 3/2007 | Christiansen et al. |
| 2007/0271283 | A1* | 11/2007 | Maryka ............ G06F 17/30905 |
| 2008/0114830 | A1 | 5/2008 | Welingkar et al. |
| 2008/0133529 | A1 | 6/2008 | Berkowitz et al. |
| 2008/0133775 | A1 | 6/2008 | Peterson et al. |
| 2008/0168526 | A1 | 7/2008 | Robbin et al. |
| 2008/0170525 | A1 | 7/2008 | Geiger |
| 2009/0077263 | A1 | 3/2009 | Koganti et al. |

(Continued)

*Primary Examiner* — Scott Baderman
*Assistant Examiner* — Jason Edwards
(74) *Attorney, Agent, or Firm* — Lowenstein Sandler LLP

(57) ABSTRACT

A user device receives a user input that causes an electronic publication to have a modified state. The user device generates data that, when used to render the electronic publication, causes the electronic publication to have the modified state. The user device transmits the data to a server.

21 Claims, 7 Drawing Sheets

(56) References Cited

U.S. PATENT DOCUMENTS

| | | | |
|---|---|---|---|
| 2009/0144613 A1* | 6/2009 | Schneider | G06F 17/30893 715/235 |
| 2009/0259711 A1* | 10/2009 | Drieu et al. | 709/201 |
| 2009/0317778 A1 | 12/2009 | Oberman | |
| 2010/0042235 A1 | 2/2010 | Basso et al. | |
| 2010/0042702 A1 | 2/2010 | Hanses | |
| 2011/0099467 A1* | 4/2011 | Kapur et al. | 715/236 |
| 2011/0107217 A1* | 5/2011 | Schwarz | G06F 3/0484 715/716 |
| 2011/0296317 A1* | 12/2011 | Ishihara | G06F 17/2211 715/753 |
| 2012/0089592 A1* | 4/2012 | Hollingsworth | 707/711 |
| 2013/0013812 A1* | 1/2013 | Kessel et al. | 709/248 |
| 2013/0014028 A1* | 1/2013 | Lemmey et al. | 715/753 |
| 2014/0053128 A1* | 2/2014 | Kuper | G06F 9/485 717/106 |

* cited by examiner

SYNCHRONIZING ELECTRONIC PUBLICATIONS BETWEEN USER DEVICES

BACKGROUND

There are multiple system architectures for delivering electronic publications to user devices. Some of these system architectures synchronize a last page read between multiple different user devices for a user. Additionally, some system architectures synchronize bookmarks and annotations between user devices for a user. However, the last page read, bookmarks and annotations do not represent a state of an electronic publication.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

Figure 1:
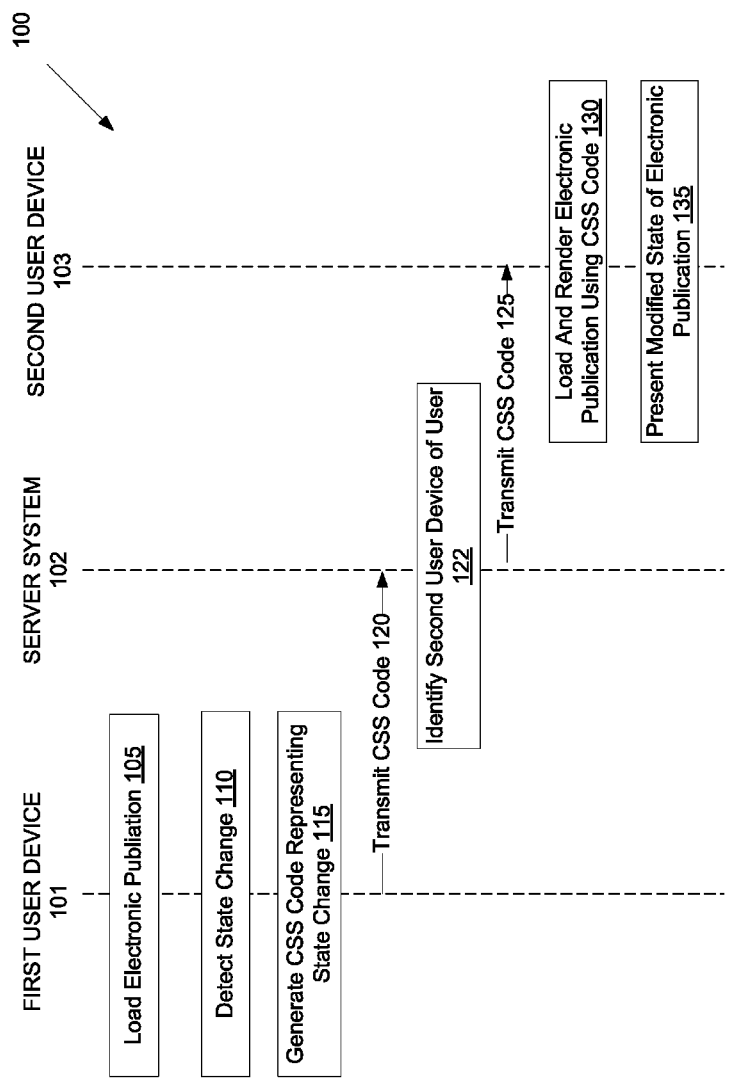
FIG. 1 is a sequence diagram of one embodiment for synchronizing a state of an electronic publication between multiple user devices.

Methods and systems for saving a state of an electronic publication and synchronizing the state of the electronic publication between user devices are described. As used herein, the state of the electronic publication is a display state or presentation state for the electronic publication that is defined in one or both of CSS code or javascript code. A modified state includes one or more user-selected properties or customizations (e.g., display properties of CSS elements) associated with particular content or components of the electronic publication that affect how that particular content will be displayed. As is described below, examples of user selected properties/customizations include user customized character names, a property specifying whether to display or hide particular content, user specified formatting for the electronic publication (e.g., fonts, background color, text color, line spacing, margins, and so forth), etc.

As a user interacts with an electronic publication presented on a user device, these interactions may cause a state of the electronic publication to change. For example, the electronic publication may have dynamic names that can be populated based on one or more names selected by the user. Additionally, the electronic publication may have questions and answers, and the answers may be hidden until a user selects for one or more of the answers to be shown. The user device may generate, for example, CSS code or javascript code that records the detected state changes. This CSS code or javascript code may be transmitted to a server and distributed to all user devices owned by (or otherwise associated with) the user. When the user opens the electronic publication on any of his user devices, the CSS code or javascript code may be used to render the electronic publication, which causes the electronic publication to have the updated state.

As used herein, an electronic publication is an electronic version of a printed publication. Examples of electronic publications include electronic books (e.g., which may be encoded in the electronic publication (EPUB), Archos diffusion (AEH), broadband ebooks (BBeB), comic book archive file (CBR), compiled HM, eReader, FictionBook, iBook, Kindle format 8 (KF8), Mobi 7, AZW, etc. formats), electronic magazines, digital newspapers, electronic journals, real simple syndication (RSS) feeds, hypertext markup language (HTML) documents, extensible markup language (XML) documents, extensible hypertext markup language (XHTML) documents, scalable vector graphics (SVG) documents, and so forth. For simplicity and clarity of the concepts presented herein, embodiments of the present application are discussed with reference to electronic publications. However, it should be understood that embodiments also apply to other types of media items such as digital audio (e.g., mp3 files, AAC files, etc.), digital images, digital video (e.g., data that has been encoded in the Windows Media®, Real Media®, Quicktime®, motion picture expert group (MPEG) 4 (also known as MP4) or Flash® video file formats), and other types of digital media.

FIG. 1 is a sequence diagram of one embodiment for synchronizing a state of an electronic publication between multiple user devices. A first user device 101 (e.g., an electronic book reader or a mobile phone) and second user device 103 may both connect to a server system 102. The first user device 101 loads and renders an electronic publication (e.g., an ebook) at block 105. The electronic publication may then be presented to a user, and the user may issue commands that change one or more parameters (e.g., font, font size, hidden elements, customizable names, etc.) of the electronic publication. Thus, a state of the electronic publication (e.g., of one or more dynamic interface elements in the electronic publication) may change while a user reads the electronic publication based on user input. For example, the user may issue a command for an answer to a question to be shown, may select a new font or font size for the electronic publication, may assign a custom name to a character in the electronic publication, and so forth. Each of these parameters may be associated with a dynamic interface element of the electronic publication. Dynamic interface elements are elements such as character names, place names, popup windows (which may be hidden or shown), publication font settings, and so forth that may be modified by a user, thus causing the electronic publication to have a new state.

At block 110, the first user device 101 detects the state change for the electronic publication. The first user device 101 may detect a user command, and determine a state change associated with the command. The first user device 101 may also monitor, for example, CSS code for the electronic publication, and may save any changes that are made to the CSS code. At block 115, the first user device 101 generates CSS code representing the detected state change. First user device 101 may generate a CSS file, may write new CSS code to an existing CSS file (e.g., to a CSS file that is a component of the electronic publication), may generate data that can be converted into CSS code, or may perform a combination thereof. Note that other data formats may additionally or alternatively be used, such as javascript code.

Once the CSS code has been generated, first user device 101 may transmit the CSS code to the server system 102 (block 120). The CSS code may be transmitted when the electronic publication closes (e.g., when a user ends a current reading session for the electronic publication). The CSS code may additionally or alternatively be transmitted to the server system 102 on a periodic basis (e.g., every 5 minutes, every hour, etc.). Other events may additionally trigger the sending of the CSS code to the server system. For example, the CSS code may be sent to the server system 102 when another message is already being sent to the server system 102. In such an instance, the CSS code may be appended to the existing message. This may conserve resources such as bandwidth.

The server system 102 may store the CSS code in a repository. The CSS code may be associated with the electronic publication in the repository. In one embodiment, the electronic publication includes a markup language file (e.g., a hypertext markup language (HTML) file or Kindle® format 8 (KF8) file) that references a particular CSS file. The CSS code may be included in a new version of the particular CSS file. The server system 102 may receive the new version of the particular CSS file, and replace an older version of the CSS file with the new version. For example, each version of the CSS file may include a modification date, and the version of the CSS file with the latest modification date may be stored. In one embodiment, the user device generates the CSS file and adds a reference to the CSS file in the markup language file. In such an embodiment, server system 102 may receive the reference along with the CSS code, and may also store the reference in the repository. The reference may be sent to user devices for insertion into the electronic publication on those user devices. In some instances, the markup language file may reference multiple different CSS files. In such an embodiment, a newest CSS file that represented a most recent state of the electronic publication may have priority, so that any conflicts between CSS files are resolved by using parameters in the newest CSS file.

Accordingly, if any user devices download the electronic publication from server system 102, then they may also receive the CSS code (e.g., a CSS file that is referenced by the markup language file in the electronic publication). At block 122, the server system 102 identifies any additional user devices associated with a same user of the first user device 101 that include the electronic publication. For example, server system 102 may maintain a table that associates users to user devices. The server system 102 may consult such a table to determine which user devices to send state data to. After identifying second user device 103, server system 102 sends the CSS code to that second user device 103 (block 125).

The user may issue a command to open the electronic publication from the second user device 103. At block 130, the second user device 103 loads and renders the electronic publication using the CSS code (or other state data such as javascript code). At block 135, the second user device 103 presents the modified state of the electronic publication. Therefore, the user may make changes to the electronic publication on the first user device 101, and may then have those same changes reflected in the electronic publication on the second user device 103. This may ensure a uniform reading experience across user devices associated with a user.

Figure 2:
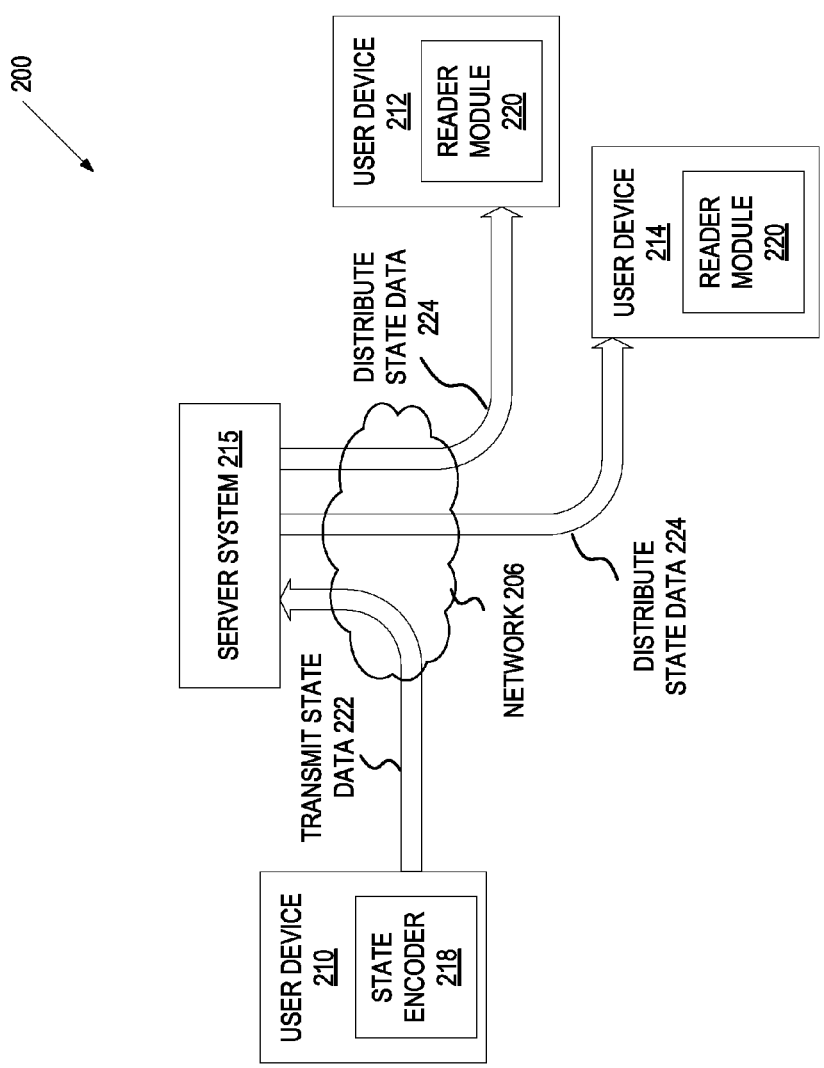
FIG. 2 illustrates multiple user devices that synchronize a state of an electronic publication via a server system.

FIG. 2 illustrates a system 200 that synchronizes a state of an electronic publication between multiple user devices. A user may access an electronic publication on a first user device 210. A state encoder 218 of the user device 210 may record any state changes made to the electronic publication based on any user interaction with the electronic publication. For example, the user may choose to reveal certain visual elements that may have been hidden, select custom names for places or characters in the electronic publication, select one or more presentation parameters (e.g., font, font size, text color, etc.) for the electronic publication, and so forth. Each of these user inputs or preferences may cause a state of the electronic publication to change. State encoder 218 may generate state data that includes such changes to the state of the electronic publication. User device 210 may then transmit the state data 222 to a server system 215 via a network 206. Note that traditional implementations of a last page read of the electronic publication, a bookmark of the electronic publication and an annotation in the electronic publication are not considered to be components of the electronic publication's state. In particular, traditional implementations of bookmarks, last page read and annotations are not defined by CSS code or javascript code. Nor do such bookmarks, last page read or annotations control how particular components of an electronic publication will be rendered or presented.

The server system 215 may determine user devices that are associated with a user of user device 210. For example, the user may have a user account that is associated with user devices 210, 212 and 214. Server system 215 then distributes the state data 224 to user devices 212, 214 via the network 206. User devices 212, 214 may each include a reader module 220 that can incorporate the received state data during loading and/or rendering of the electronic publication. Therefore, the user may make changes to the electronic publication on user device 210. The user may then open the electronic publication from user device 212, and all the state changes that the user caused to be made at user device 210 may be reflected in the state of the electronic publication on user device 212.

Figure 3:
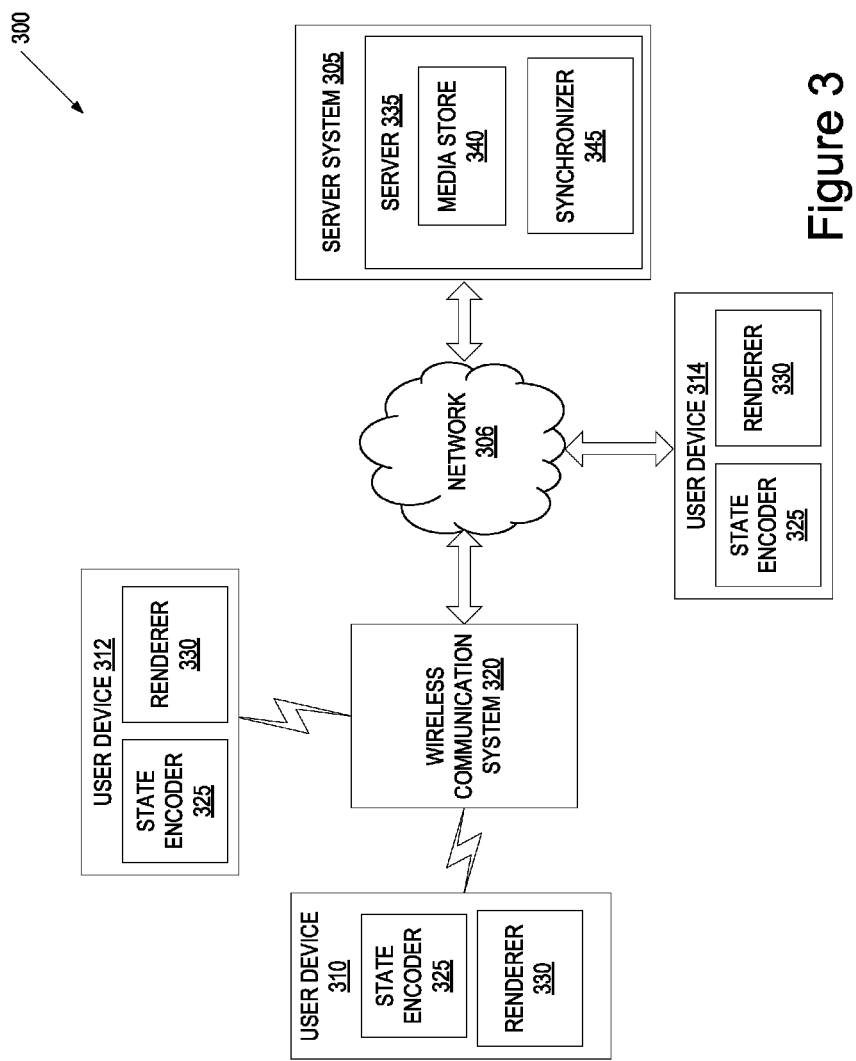
FIG. 3 is a block diagram of an exemplary network architecture, in which embodiments of the present invention may operate.

FIG. 3 is a block diagram of an exemplary network architecture 300, in which embodiments described herein may operate. The network architecture 300 may include a server system 305 and one or more user devices 310-314 capable of communicating with the server system 305 via a network 306 (e.g., a public network such as the Internet, a private network such as a local area network (LAN), or a combination thereof).

The user devices 310-314 may be portable computing devices such as an electronic book reader, notebook computer, mobile phone, tablet computer, personal digital assistant (PDA), portable media player, netbook, and the like. The user devices 310-314 may also be non-portable computing devices such as a desktop computer, a set-top box associated with a television, a gaming console, and so on. The user devices 310-314 may be configured with functionality to enable the viewing of electronic documents.

Some user devices (e.g., user devices 310-312) may be connected to the network 306 and/or to other user devices via a wireless communication system 320. The wireless communication system 320 may be a wireless infrastructure that allows users to use the user devices to communicate with server system 305 without being tethered to the server system 305 via hardwired links. Wireless communications system 320 may be a wireless fidelity (WiFi) hotspot connected with the network 306. Wireless communication system 320 may alternatively be a wireless carrier system (e.g., as provided by Verizon®, AT&T®, T-Mobile®, etc.) that can be implemented using various data processing equipment, communication towers, etc. Alternatively, or in addition, the wireless communication system 320 may rely on satellite technology to exchange information with the user device 310. Other user devices (e.g., user device 314) may be connected to the network via a wired connection (e.g., via an Ethernet connection).

In one embodiment, the network architecture 300 includes a communication-enabling system (not shown) that serves as an intermediary in passing information between the server system 305 and the wireless communication system 320. The communication-enabling system may communicate with the wireless communication system 320 (e.g., a wireless carrier) via a dedicated channel, and may communicate with the server system 305 via a non-dedicated communication mechanism, e.g., a public Wide Area Network (WAN) such as the Internet.

In one embodiment, the user devices 310-314 include a renderer 330. The renderer 330 may render electronic publications and/or other media items for presentation on the user devices 310-314. The electronic publications may include text, tables, digital video (e.g., movies, television, short clips, etc.), images (e.g., art, photographs, etc.), and other multi-media content. The media items may include electronic publications as well as images, audio content (e.g., digital audio files), movies, and so forth.

In one embodiment, renderer 330 uses state data recorded by a state encoder 325 during rendering of the electronic publication or other media item. The state encoder 325 may monitor for state changes to the electronic publication, and may generate state data that includes those state changes. The state data may include CSS code and/or javascript code. Accordingly, state encoder 325 may monitor, for example, any changes made to CSS elements, and may write such changes to a CSS file. In one embodiment, state encoder 325 modifies a markup language document in the electronic publication by adding a reference to the generated CSS file. State encoder 325 may additionally record the reference to the CSS file in the state data. Additionally, the state data may include data that can be converted into CSS code. State encoder 325 may transmit the state data to server 335 for synchronization with other user devices, such as when the electronic publication is closed or is about to be closed.

The server system 305 may include one or more machines (e.g., one or more server computers, routers, gateways, etc.) that have processing and storage capabilities to provide server-based functionality. The server system 305 may be implemented by a single machine or a cluster of machines, each of which may include data stores and/or other data processing equipment. In one embodiment, the server system 305 includes one or more network based servers, which may be hosted, for example, by network based hosting services such as Amazon's® Elastic Compute Cloud® (EC2).

The server system 305 includes a server 335, which may provide network-accessible server-based functionality. In one embodiment, the server 335 provides electronic publications to user devices 310-314 upon the user devices 310-314 accessing a media store 340 provided by the server 335. The user devices 310-314 may access the media store 340, for example, by navigating to particular web pages and selecting electronic publications for purchasing, renting, viewing, etc. The server system 305 delivers, and the user devices 310-314 receive, electronic publications that may include web pages, ebooks, and/or other electronic publications via the network 306.

The server 335 may include a synchronizer 345 that synchronizes the state of electronic publications on user devices. Synchronizer 345 may receive state data (e.g., a CSS file, CSS code, a javascript file, etc.) from a user device associated with a user account. The state data may be in a file that is referenced by an electronic publication. The file may be a new version of a preexisting file, and synchronizer 345 may overwrite the preexisting version of the file with the new version. The file may include multiple elements (e.g., CSS elements) as well as information (e.g., CSS selectors) mapping each of those elements to one or more components in the electronic publication. The synchronizer 345 may then propagate (e.g., transmit) that state data to other user devices associated with the user account to synchronize a state of the electronic publication on those user devices. The delivered state data may replace previous state data for the electronic publication that may have been resident on those user devices. For example, if a user device had an older version of a particular CSS file that represented a previous state of the electronic publication, that older version may be replaced with a new version of the CSS file that represents the modified state. Alternatively, the electronic publication may include a markup language file that references one or more CSS files. A reference to a new CSS file may be inserted into the markup language file. The delivered state data may include the reference. User devices, upon receiving the reference, may modify the markup language file by inserting the reference into it. When the electronic publication is next loaded, the newly added reference in the markup language file to the new CSS file may format the electronic publication during rendering, thus causing the electronic publication to have the modified state. Accordingly, regardless of which user device a user subsequently accesses, a latest state of the electronic publication will be presented to the user. For example, the delivered state data may cause particular text that was previously hidden to be shown, may cause character names in the electronic publication to change, my modify a font of the electronic publication, may add new images, text, video or audio to the electronic publication, and so on.

Note that embodiments of the present invention may apply to additional architectures other than the illustrated network architecture. For example, embodiments of the present invention may be used in a client server environment in which the server system is a component of a wireless carrier. Alternatively, the user devices may be set-top boxes, and the server system may be a cable head-end. Embodiments may also apply to peer-to-peer environments, in which one user device sends state data to other user devices for synchronization rather than relying on the server system to perform the synchronization.

Figure 4:
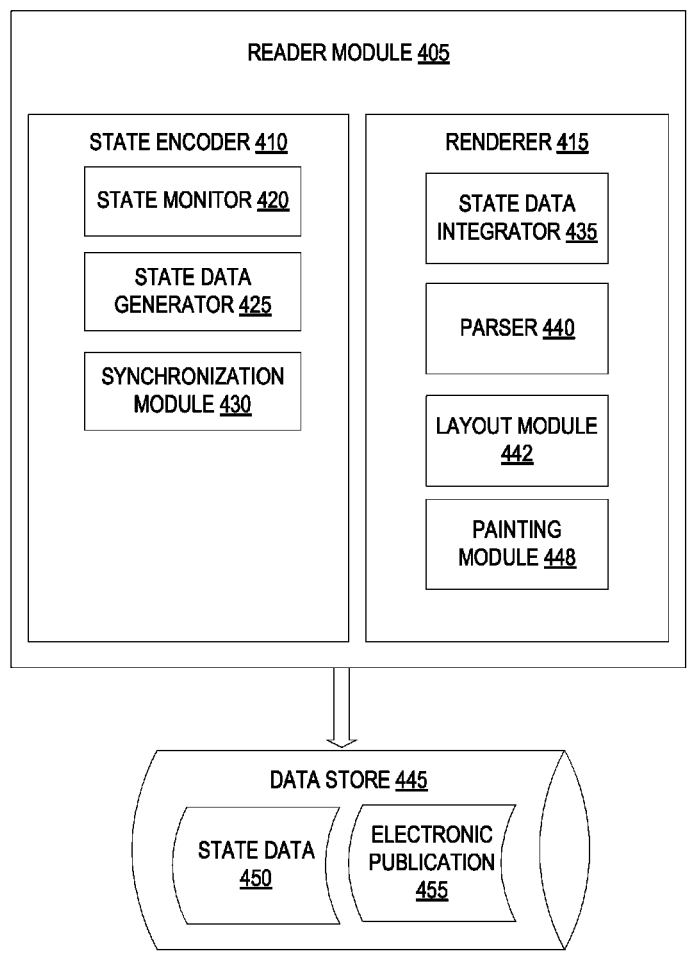
FIG. 4 is a block diagram of one embodiment of a reader module that is included in a user device.

FIG. 4 is a block diagram of one embodiment of a reader module 405, which may be included in a user device. Reader module 405 may be a component of a user device 310-314 of FIG. 3, and may include a state encoder 410 and/or a renderer 415. State encoder 410 and renderer 415 may respectively correspond to state encoder 325 and renderer 330 of FIG. 3. In some embodiments, the functionality of state encoder 410 and renderer 415 are combined into a single module. Additionally, the functionality of either or both of state encoder 410 and renderer 415 may be subdivided into multiple modules.

Reader module 405 may be connected to a data store 445 such as a memory, disk drive, or other storage. The data store 445 may store one or more electronic publications 455 as well as encoded state data 450 associated with those electronic publications.

In one embodiment, renderer 415 includes a state data integrator 435, a parser 440, a layout module 442 and a painting module 448. Renderer 415 receives an electronic publication 455 (e.g., retrieves the electronic publication 455 from storage or receives the electronic publication 455 from a server). Each electronic publication 455 includes a series of tags and/or attributes. The tags may include HTML tags (e.g., HTML5 tags), XHTML tags, or other types of tags that represent elements of the electronic document, including attribute, formatting and placement information for such elements (e.g., such as font information, relative positioning information, etc.), and so on. The attributes may describe presentation semantics (the look and formatting) of an electronic publication, such as layout, colors, fonts, etc. In one embodiment, the attributes are cascading stylesheet (CSS) attributes. The tags and attributes may both be contained within a single file, or may be contained in a collection of files. For example, an electronic publication may include one or more HTML files and one or more separate CSS files. Different electronic publication formats provide different standards for the types of tags and attributes, contents of tags and attributes, tag and attribute syntax, and arrangement of tags and attributes in the electronic publications.

State data integrator 435 integrates encoded state data 450 into an electronic publication 455. The state data 450 may represent a state of the electronic publication, including a state of any interactive content included in the electronic publication. The encoded state data 450 may include layout parameters that a user has selected for the electronic publication 455, such as font size, font, margins, line spacing, background color, type color, and so on. The encoded state data 450 may also include data identifying whether particular elements should be hidden or shown. Additionally, the encoded state data 450 may include user specified images that are to be shown in the electronic publication, user notes (e.g., hand written notes) that are to be shown in the electronic publication, user defined character and/or place names that are to be used for characters/places in the electronic publication, and so forth. One example of interactive content that may be reflected in the state data 450 is user customizable content, such as user customizable character names and place names.

In one embodiment, the encoded state data 450 is or includes CSS code, which may be included in a distinct CSS file or may be incorporated into a preexisting CSS file of the electronic publication. Many interactive features and user selections or preferences may be represented using CSS elements. By changing particular CSS elements included in the electronic publication, creating CSS elements that override or replace default or original CSS elements and/or generating new CSS elements, user interactions and selected options may be recorded.

In one example, an electronic publication includes default CSS elements for font, font size, background color, and so forth. State data 450 may include new CSS elements that override the default CSS elements in accordance with user input. In another example, an electronic publication may include CSS elements that initially have a value of "hidden." As a user requests that the CSS elements be shown, state data 450 may be recorded that assigns a value of "shown" to those CSS elements. Additionally, a CSS element may have a default X and Y position. However, a user may move the CSS element, causing it to have a new X and Y position. The new X and Y position for the CSS element may be recorded in the state data. In yet another example, a publisher of an electronic publication may decide to provide users with an option to select character names. They may generate the electronic publication with pre-generated content CSS elements that refer to a particular character's name. Everywhere a pre-generated content CSS element with a particular identifier appears in the electronic publication, a user selected name may be populated, and may replace a default name. A user may input a character name for the pre-generated content CSS element, and this name may be stored in the state data in associated with the identifier. Therefore, some types of CSS elements (e.g., for performing name injection), a publisher would provide place holders in the electronic publication. For other types of CSS elements (e.g., font, font size, etc.), there may be no publisher provided place holders.

If the encoded state data 450 includes CSS code, the state data integrator 435 provides the CSS code to the parser 440 and/or layout module 444. State data integrator 435 may instruct the layout module 444 to prioritize the CSS code in the encoded state data 450 over other CSS code included in the electronic publication. Therefore, in instances where there is a conflict between CSS code in the encoded state data 450 and CSS code in the electronic publication 455, the CSS code from the encoded state data 450 will be used.

The electronic publication may include a pointer to an initially empty CSS file, which may later be populated with the state data 450. Alternatively, the electronic publication may include a pointer to a location that is to be checked for state data (e.g., for a CSS file), which may later be generated. A pointer may also be added to the electronic publication when state data is generated. Additionally, or alternatively, the state data may be associated with the electronic publication without making any modifications to the electronic publication (e.g., without adding a pointer to the electronic publication). In such an embodiment, state data integrator 435 may be configured to check for state data regardless of presence or lack of a pointer in the electronic publication.

The encoded state data 450 may also be data that can be converted into CSS data. If the encoded state data 450 includes data that can be converted into CSS code, state data integrator 435 may perform such a conversion before providing the CSS code to the parser 440 and/or layout module 444. For example, the encoded state data 450 may include one or more user specified names, each of which may be associated with an identifier. State data integrator 435 may include rules for generating CSS code that causes all instances of a particular CSS element to have the specified name based on user specified name and identifier.

State data 450 may include a user generated drawings, handwritten notes, or other user generated graphic. Such state data may be generated in response to receiving user drawing commands and saving the commands or a drawing generated based on the commands to a file. In one embodiment, the drawing is stored as a javascript object described below). In another embodiment, state data generator 425 generates an SVG drawing (e.g., an SVG file) to represent the user generated graphic. State data generator 425 may additionally generate CSS code that references the SVG drawing. Therefore, the SVG drawing may be identified and rendered when the CSS code is parsed and/or rendered along with the electronic publication.

In one embodiment, the encoded state data 450 is javascript code, which may be included in a javascript object that was created during a javascript session. HTML5 can be used to store states (e.g., execution states) of a javascript execution environment. Javascript objects created within a javascript session may be stored outside of the session to a file. These javascript objects may be used when executing a new javascript instance to recreate a state of the previous javascript session.

If the encoded state data 450 includes javascript code (e.g., a javascript object), then once the electronic publication 455 is loaded, state data integrator 435 may cause a javascript instance to be executed using the javascript code. This may cause the electronic publication 455 to have a user specified state. In some embodiments, the encoded state data 450 includes a combination of CSS code, javascript code and/or other data.

Parser 440 parses the electronic publication 455 and/or the state data 450. Parsing an electronic publication may include walking through the electronic publication and identifying each tag and/or attribute in the electronic publication, as well as the position of the tag or attribute in the electronic publication. For example, parser 440 may identify a byte offset of each element of the electronic publication, and may generate a hierarchical structure such as a tree that contains relational information about the elements.

In one embodiment, parsing the electronic document includes building a Document Object Model (DOM) tree from the identified tags. Parser 440 may generate a node in the DOM tree for each tag (or each tag pair) included in the electronic publication. A tag pair includes an open tag and a close tag, both associated with a particular node. A DOM tree has at a root node that may represent a first element in the electronic publication. The DOM tree has additional nodes that are children of the root node, nodes that are children of those children nodes, and so on down to leaf nodes, which have no children. Nodes generated from tags that occur after a previous open tag and before the previous open tag's corresponding close tag are children of the node representing the previous open tag.

In one embodiment, the parser 440 uses a counter to count the number of bytes that have been parsed. Each time a tag is encountered in the electronic publication, parser 440 may record the byte count at the location in the electronic publication for that tag. Parser 440 may identify a byte offset within the electronic publication for each tag. Parser 440 may add the byte offset information for a tag to an appropriate node of the DOM tree. Each node may be assigned a start byte offset and an end byte offset.

Layout module 445 then generates a layout of the electronic publication. This may include generating a render tree for the electronic publication. The render tree is a counterpart to the DOM tree, and may be generated based on the DOM tree and/or cascading style sheet (CSS) code. The render tree is a tree of render objects. Each render object contains render information such as contents (e.g., text, image, video, etc.) and render logic. Each render object may include information from multiple nodes in the DOM tree. In one embodiment, a render object is a visual element of the document. The layout module 445 determines one or more properties to apply to the render objects, such as font size, visual element criteria (e.g., image size restrictions), margins, text color, background color, line spacing, and so forth. These properties may be identified in the electronic publication 455 and/or may be identified in the encoded state data 450.

In one embodiment, state data integrator 435 is a component of layout module 445. State data integrator 435 may incorporate the state data 450 during generation of the render tree. For example, if the state data 450 is CSS code, state data integrator 435 may cause layout module 442 to incorporate the CSS code of the state data 450 into the render tree.

Layout module 442 may then generate a layout using the generated DOM tree and/or render tree. Layout module 442 may generate the layout by fixing a layout width and/or height that may be equal to or smaller than the display width and/or height. Generating the layout may include determining positions (e.g., x and y coordinates) and sizes (e.g., height and width) for each viewable element in the electronic publication. The location and size information may be relative location and size information, or may be absolute position and size information. The layout may include position and size information for floating elements as well as standard elements having fixed positions. Accordingly, the layout may include position information and size information for each render object in the render tree.

Layout module 442 may additionally determine a number of pages to divide the electronic publication into, and determines which elements belong on each page (paginates the electronic publication) based on the determined properties, the tags and the attributes. Page breaks may be placed based on the height (e.g., in pixels), width (e.g., in pixels) and/or resolution (e.g., in pixels) of a display. In one embodiment, each page break is the closest allowed break point to the display height. The page breaks may be placed such that, for each page, the display shows a maximum amount of content (e.g., text, images, tables, or other elements) without cutting off any visual element (e.g., any line of text, picture, table, etc.). In one embodiment, a vertical start offset and a vertical end offset for each page is recorded. This information may be recorded in a vector format and associated with or attached to the layout. Generating the layout may include generating a separate page layout for each page of the electronic publication.

Layout module 442 may save a layout for the electronic publication to the data store 445. In one embodiment, the layout is cached in a volatile memory for use during a current user session. The layout may also be saved in a non-volatile storage so that the layout does not need to be re-computed in future sessions. Therefore, the layout may not need to be regenerated each time the electronic publication is loaded. Instead, painting module 448 may simply present a previously generated layout for the electronic publication.

In one embodiment, when an electronic publication having a pre-generated layout is loaded, state data integrator 435 checks to determine whether a current version of state data 450 matches a version of state data that was used to generate the layout. If the current state data 450 does not match the state data used for the layout, then state data integrator 435 may instruct the layout module 442 to generate a new layout.

Once a layout is prepared, painting module 448 may paint the contents of the layout in a display or viewport of a user device. Painting the layout for a current page includes drawing the viewable elements in the viewport to the display. Painting module 448 may determine a current page that should be displayed on the display, and may paint the contents of that page to the display. When a change page command is received, the painting module 448 paints the new page.

In one embodiment, state encoder 410 includes a state monitor 420, a state data generator 425 and a synchronization module 430. State monitor 420 monitors a state of an electronic publication that is presently loaded by the reader module 405. The reader module 405 may receive user commands that cause the state of the electronic publication 455 to change. For example, a user may input a custom character name, may request that a popup window be revealed (e.g., for an answer to a question), may select a new font, font size, or other layout parameter, and so forth. State monitor 420 may report any such changes to the state of the electronic publication 455 to state data generator 425.

State data generator 425 may include rules for generating encoded state data 450 that represents the detected state changes. In one embodiment, state data generator 425 includes rules for generating CSS code that embodies the state changes. For example, user input may cause changes to CSS elements that are included in the electronic publication. State data generator 425 may monitor for any changes to the electronic publication's CSS elements, and may copy those changes to a separate CSS file that can be propagated to other user devices. Additionally, state data generator 425 may include rules for generating javascript code (e.g., a javascript object) that embodies one or more of the state changes. State data generator 425 may additionally or alternatively include rules for generating data that is convertible into CSS code by state data integrator 435. For example, state monitor 420 may provide state data generator 425 with a data dump of every user input that has been received. State data generator 425 may store this data to a file. The file may later be processed to generate CSS code that reflects state changes caused by the user inputs.

Once state data 450 has been generated, synchronization module 430 may transmit the state data 450 to a server for distribution to other reader modules and/or other user devices. These user devices may include renderers having state data integrators that can use the received state data 450 to render the electronic publication. Therefore, all user devices belonging to or otherwise associated with a particular user may remain synchronized. For example, if a user opens a pop-up window within an electronic publication on a first user device, state data 450 may be generated recording the open state of the pop-up window, and may be distributed to the other user devices for the user. The user may then open the electronic publication in one of those other user devices and that pop-up window will be open in those other user devices.

Figure 5:
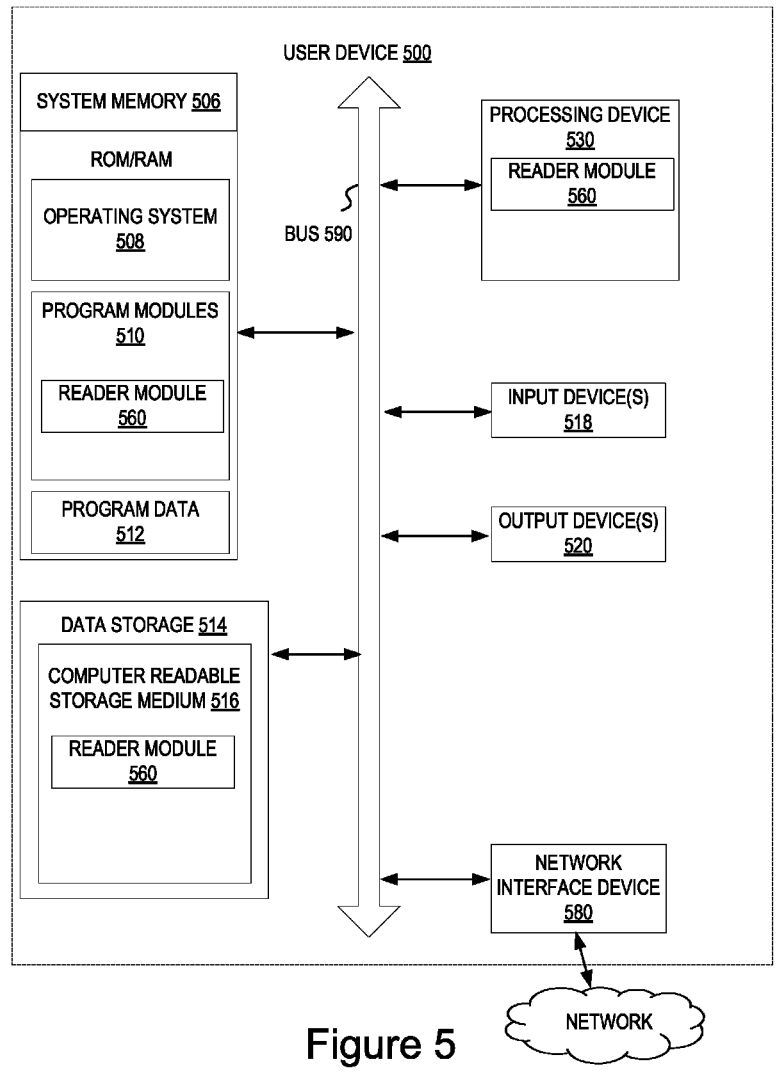
FIG. 5 is a block diagram illustrating an exemplary user device, in accordance with one embodiment of the present invention.

FIG. 5 is a block diagram illustrating an exemplary user device 500, in accordance with one embodiment of the present invention. The user device 500 may correspond to the user devices 310-314 of FIG. 3 and may be any type of user device such as an electronic book reader, a PDA, a mobile phone, a laptop computer, a portable media player, a tablet computer, an electronic pad, a desktop computer, a camera, a video camera, a netbook, and the like.

The user device 500 includes a processing device 530, which may include one or more processors such as CPUs, microcontrollers, field programmable gate arrays, or other types of processors. The user device 500 also includes system memory 506, which may correspond to any combination of volatile and/or non-volatile storage mechanisms. The system memory 506 stores information which provides an operating system component 508, various program modules 510 such as reader module 560, and/or other components (e.g., a web browser). The user device 500 performs functions by using the processing device 530 to execute instructions provided by the system memory 506.

The user device 500 also includes a data storage device 514 that may be composed of one or more types of removable storage and/or one or more types of non-removable storage. The data storage device 514 includes a computer-readable storage medium 516 on which is stored one or more sets of instructions embodying any one or more of the methodologies or functions described herein. As shown, instructions for the reader module 560 may reside, completely or at least partially, within the computer readable storage medium 516, system memory 506 and/or within the processing device 530 during execution thereof by the user device 500, the system memory 506 and the processing device 530 also constituting computer-readable media. The user device 500 may also include one or more input devices 518 (keyboard, mouse device, specialized selection keys, etc.) and one or more output devices 520 (displays, printers, audio output mechanisms, etc.).

The user device 500 may also include a network interface device 580 such as a wireless modem to allow the user device 500 to communicate via a wireless network (e.g., such as provided by the wireless communication system) with other computing devices, such as a server system and/or other user devices. The network interface device 580 may be a wireless modem that allows the user device 500 to handle both voice and non-voice communications (such as communications for text messages, multimedia messages, media downloads, web browsing, etc.) with the wireless communication system 520. The wireless modem may provide network connectivity using any type of mobile network technology. The wireless modem may generate signals and send these signals to power amplifier (amp) for amplification, after which they are wirelessly transmitted via an antenna. In addition to sending data, the antenna also receives data (e.g., electronic publications and/or state data), which may be sent to wireless modem and/or transferred to the processing device 530.

Figure 6:
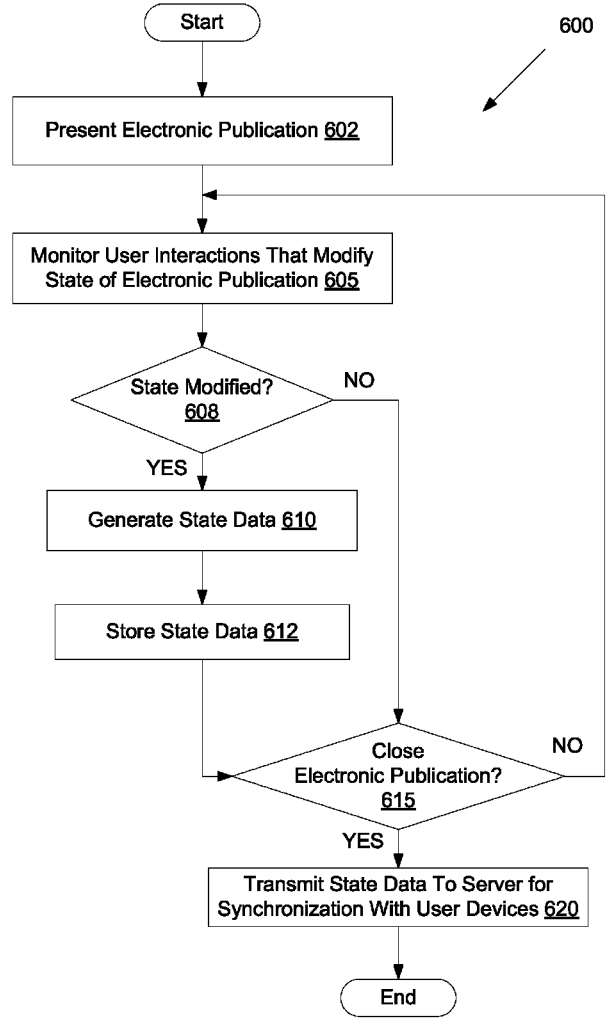
FIG. 6 is a flow diagram of one embodiment for a method of saving a state of an electronic publication.
Figure 7:
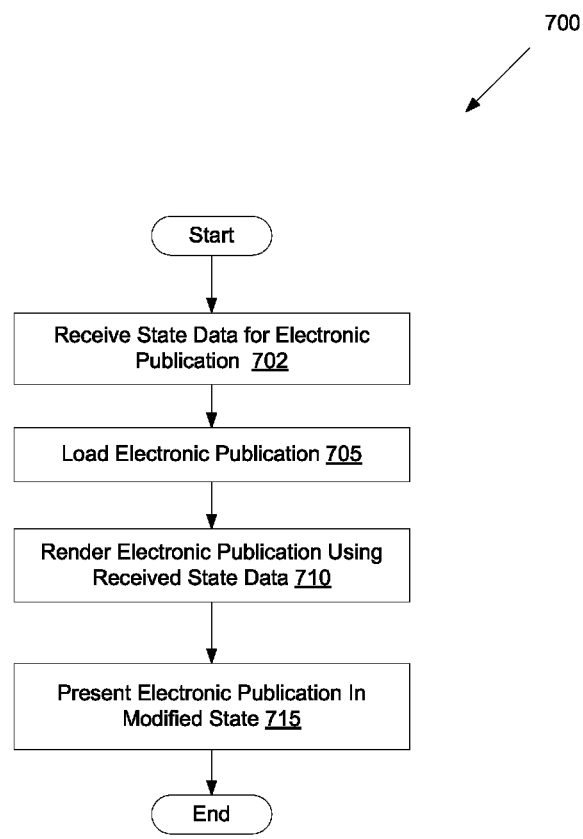
FIG. 7 is a flow diagram of one embodiment for a method of synchronizing a state of an electronic publication on a user device.

FIGS. 6-7 are flow diagrams of various implementations of methods related to synchronizing electronic publications between user devices. The methods are performed by processing logic that may include hardware (circuitry, dedicated logic, etc.), software (such as is run on a general purpose computer system or a dedicated machine), or a combination of both. In one implementation, the methods may be performed by reader module 405 of FIG. 4, which may be incorporated into any number of user devices.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 6 is a flow diagram illustrating one embodiment for a method 600 of saving a state of an electronic publication. At block 602 of method 600, processing logic presents an electronic publication on a display of a user device. At block 605, processing logic monitors for user interactions that modify a state of the electronic publication. Such user interactions may include user selection of a font size, font, background color, margin, line spacing, etc. for the electronic publication. Other examples of such user interactions include user input defining character names for the electronic publication, user input moving or creating visual elements of the electronic publication, user input to reveal or hide visual elements, and so on.

At block 608, processing logic determines whether a state of the electronic publication has been modified. If the Electronic publication has been modified, the method continues to block 610. Otherwise, the method proceeds to block 615.

At block 610, processing logic generates state data that reflects the modified state. The state data may include CSS code, javascript code and/or data that can be converted into CSS code. The state data may be generated by processing logic specifically for the electronic publication based on user interactions and/or preferences. For example, the state data may be a CSS file that is specific to the electronic publication and the user. At block 612, processing logic stores the state data. Therefore, if the electronic publication is closed and then reopened, the electronic publication will have the same state that it was left in.

At block 615, processing logic determines whether the electronic publication should be closed. For example, processing logic may determine whether a command to close the electronic publication has been received, a command to power down a user device has been received, or a battery indicator shows that the user device will run out of power imminently. If the electronic publication is not to be closed, the method returns to block 605, and processing logic continues to monitor for user interactions that modify a state of the electronic publication. If the electronic publication is to be closed, processing logic continues to block 620.

At block 620, processing logic transmits the state data to a server for synchronization with other user device before or after closing the electronic publication. Note that processing logic may also transmit state data to the server at other times. For example, processing logic may transmit the state data periodically (e.g., every 5 minutes, when a message is already being sent to server to which the state data can be attached, or on some other trigger).

FIG. 7 is a flow diagram of one embodiment for a method 700 of synchronizing a state of an electronic publication on a user device. At block 702 of method 700, processing logic receives state data for an electronic publication. The state data may include a CSS file or other CSS code, a javascript object or other javascript code, or other data representative of an electronic publication's state (e.g., data translatable into CSS code). The state data may represent a modified state of the electronic publication. The modified state may have been caused by a user interaction with another user device that was presenting the electronic publication.

At block 705, processing logic loads the electronic publication. At a time of loading, processing logic may check whether there is any state data associated with the electronic publication. For example, processing logic may check a particular storage location for a file associated with the electronic publication. If such a file is identified, then the file may be opened to determine state changes that have been made to the electronic publication as a result of user interaction and/or preferences. At block 710, processing logic renders the electronic publication using the received state data. At block 715, processing logic presents the publication in the modified state.

Once method 700 completes, method 600 may be initiated to track state changes and maintain synchronization of the electronic publication between user devices.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating", "computing", "painting", "scanning", "identifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
presenting an electronic publication by a user device, the electronic publication comprising a markup language document and an original cascading stylesheet (CSS) file, wherein the electronic publication is received by the user device;
detecting, by the user device, one or more user interactions that modify a state of the electronic publication on the user device, wherein an original state of the electronic publication comprises a default name associated with a first component of the electronic publication, and wherein a modified state of the electronic publication comprises a new name associated with the first component of the electronic publication;
generating, by the user device without user input, in response to the detecting and based on the one or more user interactions, a first version of a new CSS file incorporating a CSS element associated with the modified state, wherein the original CSS file formats a second component of the electronic publication, and wherein the new CSS file, when referenced in the markup language document, overrides a portion of the original CSS file and formats the first component of the electronic publication to cause the electronic publication to have the modified state;

storing the first version of the new CSS file by the user device; and sending, by the user device, the first version of the new CSS file to a server for synchronization with other user devices, wherein the first version of the new CSS file causes the new name to be displayed rather than the default name.

2. The method of claim 1, further comprising:

receiving a second version of the new CSS file associated with a new state of the electronic publication from the server, the second version of the new CSS file having been generated by another user device;

replacing the first version of the new CSS file with the second version of the new CSS file;

identifying the first component of the electronic publication to format using the CSS element in the second version of the new CSS file; and formatting the first component using the second version of the new CSS file to cause the electronic publication to have the new state.

3. The method of claim 1, wherein generating the first version of the new CSS file is generated without modifying the original CSS file.

4. The method of claim 1, further comprising:

adding a reference to the new CSS file in the markup language document; and sending the reference to the server for synchronization with the other user devices.

5. The method of claim 1, wherein the other user devices are to prioritize first CSS code in the first version of the new CCS file over second CSS code in the original CSS file and wherein the electronic publication comprises a pointer to a location of the first version of the new CSS file.

6. The method of claim 1, wherein the one or more user interactions that modify the state of the electronic publication are detected as the electronic publication is read on the user device by a user.

7. A method comprising:

receiving, by a user device, a user input that modifies a state of an electronic publication, the electronic publication comprising a markup language document and an original cascading stylesheet (CSS) file;

generating, by the user device, a script object comprising script code that reflects a modified state of the electronic publication, wherein the script object is created within a script execution environment running on the user device, wherein an original state of the electronic publication comprises an original property associated with a first component of the electronic publication, and wherein a modified state of the electronic publication comprises a new property associated with the first component of the electronic publication;

storing the script object to a script file outside of the script execution environment, wherein the script file causes a new script execution environment to be executed using the script object during loading of the electronic publication, and wherein the script object formats the electronic publication to override a portion of the original CSS file comprising the first component to cause the electronic publication to have the modified state; and sending, by the user device, the script file to a server.

8. The method of claim 7, wherein the user input comprises a user selection of one or more user preferences for the electronic publication.

9. The method of claim 7, wherein the user input causes a change to the original CSS file of the electronic publication.

10. The method of claim 9, wherein the change to the original CSS file comprises at least one of an instruction to cause text associated with the original CSS file to be hidden, an instruction to cause text associated with the original CSS file to be shown, or an instruction to cause text associated with the original CSS file to have a particular position.

11. The method of claim 9, wherein the original CSS file includes a default name associated with a character in the electronic publication, and wherein the change to the original CSS file comprises replacing the default name with a user specified name.

12. The method of claim 7, wherein receiving the user input comprises receiving drawing commands by the user device, the method further comprising:

generating a drawing based on the received drawing commands, wherein the script object comprises the drawing.

13. A non-transitory computer readable storage medium having instructions that, when executed by a user device, cause the user device to perform operations comprising:

presenting an electronic publication by the user device, the electronic publication comprising a markup language document and an original cascading stylesheet (CSS) file wherein the electronic publication is received by the user device;

receiving, by the user device, a user input that causes the electronic publication to have a modified state, the user input comprising drawing commands and the electronic publication comprising a markup language document;

generating a drawing based on the received drawing commands;

automatically generating, by the user device, a new CSS file that includes a pointer to the drawing, wherein the original CSS file formats a first component of the electronic publication, and wherein the new CSS file, when referenced in the markup language document, overrides a portion of the original CSS file and formats a second component of the electronic publication to cause the electronic publication to have the modified state and present the drawing;

saving the drawing and the new CSS file; and sending the drawing and the new CSS file to a server.

14. The non-transitory computer readable storage medium of claim 13, the operations further comprising:

automatically generating script code that will further format the electronic publication to cause the electronic publication to have the modified state; and sending the script code to the server.

15. The non-transitory computer readable storage medium of claim 13, the operations further comprising:

receiving updated data associated with a new state of the electronic publication from the server, the updated data having been generated by another user device; and rendering the electronic publication using the updated data to cause the electronic publication to have the new state.

16. The non-transitory computer readable storage medium of claim 13, wherein the user input further comprises user selection of one or more user preferences for the electronic publication.

17. The non-transitory computer readable storage medium of claim 13, wherein the modified state further comprises a change to a CSS element included in the original CSS file.

18. The non-transitory computer readable storage medium of claim 17, wherein the change to the CSS element comprises at least one of an instruction to cause a component associated with the CSS element to be hidden, an instruction to cause the component associated with the CSS element to be shown, or an instruction to cause the component associated with the CSS element to have a particular position.

19. The non-transitory computer readable storage medium of claim 13, wherein the drawing comprises an SVG file.

20. A first user device comprising:
   a memory to store an electronic publication, the electronic publication comprising a markup language document and a cascading stylesheet (CSS) file; and
   a processing device, coupled to the memory, to:
      receive a script file associated with a modified state of the electronic publication from a server, the script file comprising a script object and having been automatically generated responsive user interactions with the electronic publication on a second user device, wherein the script object formats the electronic publication to override a portion of the CSS file;
      load the electronic publication;
      execute a script execution environment using the script object from the script file to recreate a state of a prior script execution environment associated with the modified state; and
      provide a presentation of the electronic publication using the script object, wherein the presentation of the electronic publication has the modified state.

21. The user device of claim 20, wherein:
the processing device is further to:
   receive a user input that causes the electronic publication to have a new modified state;
   generate updated data that, when used to present the electronic publication, causes the electronic publication to have the new modified state; and
   initiate transmission of the updated data to the server.

* * * * *